United States Patent Office 3,140,453
Patented July 7, 1964

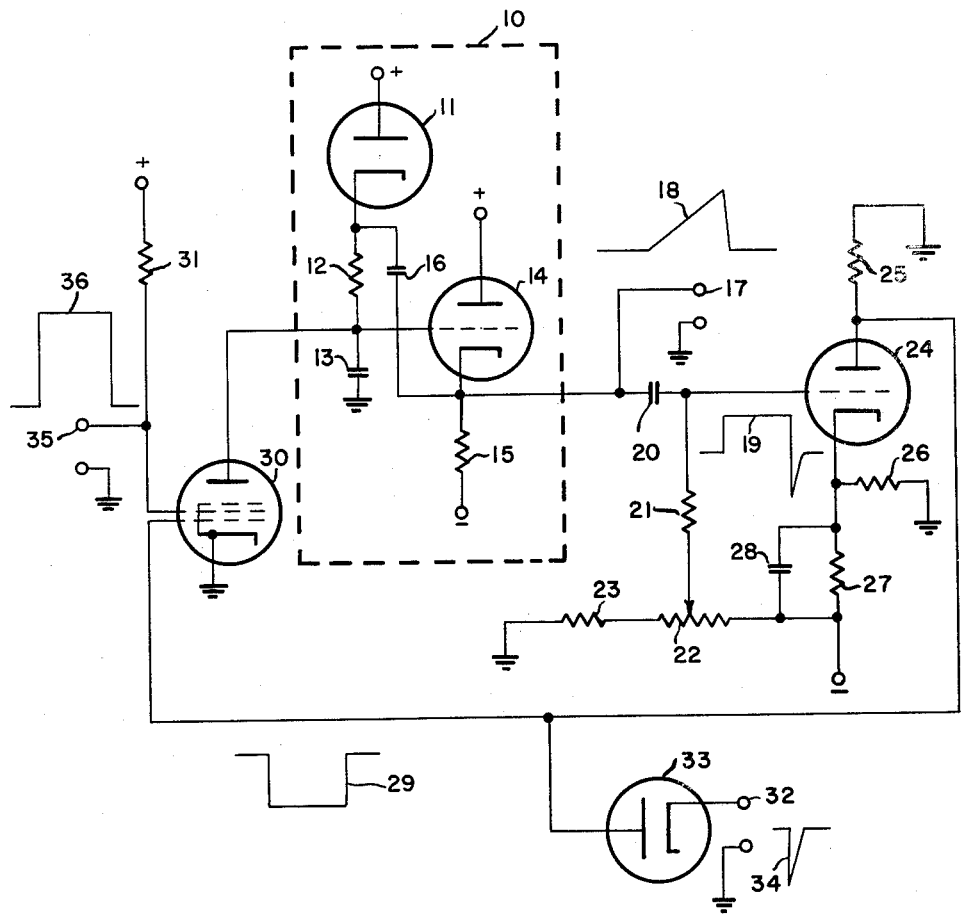

3,140,453
LINEAR SWEEP GENERATOR
Royal E. Lyon, Van Nuys, Calif., assignor to Hughes Aircraft Company, Culver City, Calif., a corporation of Delaware
Filed Dec. 1, 1961, Ser. No. 157,303
4 Claims. (Cl. 331—152)

The present invention relates to sweep generator circuits and, more particularly, to a so-called bootstrap type of sweep generator circuit in which the output sweep voltage is differentiated and utilized as a gate signal to control the generation of the sweep voltage.

Time base or sweep generator circuits for use in the display of waveforms on a cathode ray tube may be of the bootstrap type which generate a linear sawtooth sweep voltage at a low output impedance by the use of a cathode follower in a feedback arrangement to charge a capacitor with a constant current. A discharge device is provided to discharge the capacitor at the end of the sweep. Ordinarily, the bootstrap type of sweep generator is not free-running and must be driven by an external source of pulses. The discharge device is gated on and off by the pulses which must have a duration equal to the desired duration of the output sweep voltage. Frequently, a separate multivibrator circuit is utilized to provide gate pulses to the discharge device of the bootstrap sweep generator. This results in the use of an unnecessarily complex circuit having an unnecessarily large number of components to obtain a linear sweep voltage.

Accordingly, it is an object of the present invention to provide a bootstrap type of linear sweep generator circuit which does not require an external source of driving or gating pulses and yet is simple and utilizes few components.

In accordance with these and other objects of the invention, a bootstrap cathode follower circuit linearly charges a capacitor to provide an output sawtooth sweep voltage that is differentiated, amplified and applied as a gate signal to a discharge device connected across the capacitor. The circuit is free-running and produces a recurrent sweep voltage. If desired, the circuit may be adjusted by means of a potentiometer for triggered operation from a source of external synchronizing pulses. The circuit also provides pulses which may be used for gating on or unblanking the trace on a cathode ray tube.

The following specification and the accompanying drawing describe and illustrate an exemplification of the present invention. Consideration of the specification and drawing will provide a complete understanding of the invention including the novel features and objects thereof.

The single figure of the drawing is a schematic circuit diagram of an embodiment of a linear sweep generator constructed in accordance with the present invention.

Referring now to the drawing, the dashed rectangle encloses a conventional bootstrap cathode follower circuit 10 which is substantially identical to that shown on page 269 of the book "Waveforms," vol. 19 of the MIT Radiation Laboratory Series, published in 1949 by the McGraw-Hill Book Co. The bootstrap cathode follower circuit 10 comprises a diode 11 having an anode connected to a source of potential that is positive with respect to ground and a cathode connected to one end of a resistor 12. The other end of the resistor 12 is connected to one end of a capacitor 13 which has its remaining end connected to ground. A three element electron discharge device or triode 14 has an anode connected to the source of positive potential and a cathode connected through a series resistor 15 to a source of potential that is negative with respect to ground. The control electrode or grid of the triode 14 is connected to the junction between the resistor 12 and the capacitor 13. A feedback capacitor 16 is connected from the cathode of the triode 14 to the junction between the cathode of the diode 11 and the resistor 12.

The capacitor 13 charges through the resistor 12 and the diode 11. The voltage across the capacitor 13 is applied to the grid of the triode 14, which is connected as a cathode follower and produces at the cathode a voltage that is substantially identical to that at the grid. The voltage at the cathode of the triode 14 is applied by the feedback capacitor 16 to the cathode of the diode 11. Hence, as the voltage at the lower end of the resistor 12 rises, the voltage at the upper end thereof rises by an equal amount. For this reason, the circuit is said to lift itself by its own bootstrap. Because of the constant voltage maintained across the resistor 12, the capacitor 13 is charged linearly by a constant current. The diode 11 serves as a unilateral impedance element which will permit the voltage at the upper end of the resistor 12 to rise to a value greater than the positive potential at the anode of the diode 11.

The output sweep voltage of the bootstrap cathode follower circuit 10 appears at an output terminal 17 with respect to ground, the output terminal 17 being connected to the cathode of the triode 14. The waveform of the output sawtooth sweep voltage is indicated at 18. A differentiating circuit is connected to the output of the cathode follower and comprises a differentiating capacitor 20 and a differentiating resistor 21. One end of the differentiating capacitor 20 is connected to the cathode of the triode 14, and the other end of the capacitor 20 is connected to one end of the resistor 21. The remaining end of the resistor 21 is connected to the slider of a bias potentiometer 22 which has one end connected to the source of negative potential and the other end connected by a resistor 23 to ground. The differentiated sweep voltage appears across the differentiating resistor 21 and the waveform is indicated at 19.

An inverting amplifier circuit has the differentiated sweep voltage applied to it. The inverting amplifier circuit comprises a triode 24 having an anode connected through a resistor 25 to ground. The cathode of the triode 24 is connected by a first resistor 26 to ground, and by a second resistor 27 to the source of negative potential. The second resistor 27 is bypassed by a bypass capacitor 28 connected in parallel therewith. The grid of the triode 24 is connected to the junction between the differentiating capacitor 20 and the resistor 21. The amplified differentiated sweep voltage appears across the anode resistor 25 and the waveform is indicated at 29.

A discharge circuit is connected across the sweep capacitor 13 of the bootstrap cathode follower circuit 10. The discharge circuit comprises a pentode 30 having an anode connected to the junction between the sweep capacitor 13 and the resistor 12 and the cathode connected to ground. The suppressor grid is internally connected to the cathode and the screen grid is connected through a resistor 31 to the source of positive potential. The control grid of the discharge pentode 30 is connected to the anode of the amplifier triode 24.

An input terminal 32, to which negative trigger pulses may be applied with respect to ground, is connected to the cathode of a diode 33. The anode of the diode 33 is connected to the junction between the anode of the amplifier triode 24 and the control grid of the discharge pentode 30. The waveform of the trigger pulses is illustrated at 34. An output terminal 35 at which cathode ray tube gating or unblanking pulses appear with respect to ground is connected to the screen grid of the discharge pentode 30. The waveform of the gating pulses is illustrated at 36. These gating pulses may be applied to a cathode ray tube for gating on the trace in synchronism with the sweep voltage appearing at the output terminal 17 of the bootstrap cathode follower circuit 10.

In free-running or recurrent operation, the slider of the potentiometer 22 is positioned toward the side connected to ground. Initially, the discharge pentode 30 is nonconductive and presents a high impedance in parallel with the sweep capacitor 13 which charges linearly, as hereinbefore described to produce the rising portion of the sawtooth sweep voltage waveform 18 at the output terminal 17. The sweep voltage is differentiated by the differentiating resistor 21 and capacitor 20 to develop a rectangular pulse at the grid of the amplifier triode 24. The rectangular pulse has a duration equal to that of the rising portion of the sweep voltage waveform and is negative with respect to ground, although it rises toward a less negative potential. The rectangular pulse causes the amplifier triode 24 to become conductive and produce at its anode a rectangular gate pulse that is inverted with respect to the pulse applied to the grid. The gate pulse is negative, falling from ground potential to a negative potential. The gate pulse, which is applied to the control grid of the discharge pentode 30, maintains the pentode 30 in a nonconductive condition.

As the voltage at the grid of the cathode follower triode 14 continues to rise, the cathode follower triode 14 saturates, the sweep voltage stops rising and the voltage across the differentiating resistor 21 immediately and rapidly falls. This falling voltage at the grid of the amplifier triode 24 immediately causes the conduction of the triode 24 to decrease, which starts the termination of the negative gate pulse applied to the control grid of the discharge pentode 30. The discharge pentode 30 becomes conductive and discharges the sweep capacitor 13, causing the sweep voltage at terminal 17 to fall rapidly. The falling portion of the sawtooth sweep voltage, when differentiated, produces a sharp, negative-going spike at the grid of the amplifier triode 24 which causes the amplifier triode 24 to become nonconductive. At the termination of the negative-going spike at the grid of the amplifier triode 24, conduction thereof again begins, causing the initiation of another negative gate pulse applied to the control grid of the discharge pentode 30. The discharge pentode 30 becomes nonconductive, the sweep capacitor 13 again charges linearly, resulting in the next sweep voltage waveform appearing at the output terminal 17. Thus, a recurrent linear sawtooth sweep voltage is produced by the circuit of the present invention.

For triggered operation, the slider of the potentiometer 22 is positioned toward the side connected to the source of negative potential. This increases the negative bias of the amplifier triode 24. The operation of the circuit is generally the same as aforedescribed except that when the amplifier triode 24 becomes nonconductive due to the negative-going spike produced by differentiating the falling portion of the sweep voltage, the amplifier triode 24 remains nonconductive after the termination of the spike due to the increased negative bias. The application of a negative trigger pulse to the terminal 32 causes the discharge pentode 30 to become nonconductive. The sweep capacitor 13 charges and the amplifier triode 24 becomes conductive again. Thus, each sawtooth sweep waveform is initiated by the applied trigger pulses. Note that it is not necessary for the trigger pulses to be of long duration.

When the discharge pentode 30 is nonconductive, the voltage at the screen grid thereof rises. Hence, a positive pulse, coincident with the rising portion of the sweep waveform is produced at the terminal 35. This positive pulse cathode ray tube.

Thus, there has been described a self-gating bootstrap may be used for gating on or unblanking the trace of a type of linear sawtooth sweep generator in which the output sweep voltage is differentiated and utilized as a gate signal to control the generation of the sweep voltage.

The linear sweep generator of the present invention is simple and uses few components.

While only one embodiment of the invention has been shown and described, modifications may be made, and it is intended in the appended claims to cover all such modifications as may fall within the true spirit and scope of the invention.

What is claimed is:
1. A linear sawtooth generator comprising:
   (a) a capacitor, a resistor, and a unilateral impedance device connected in series in the order named across a source of potential, the charging of said capacitor through said resistor providing a sawtooth waveform;
   (b) a cathode follower amplifier circuit having a grid connected to the junction between said capacitor and said resistor, and having a cathode coupled to the junction between said resistor and said unilateral impedance device to provide a constant charging current for linearizing said sawtooth waveform;
   (c) a controllable discharge device connected in parallel with said capacitor for discharging said capacitor and being responsive to control signals applied to a control electrode for permitting said capacitor to charge;
   (d) a differentiating capacitor and a differentiating resistor connected in series, the remaining terminal of said differentiating capacitor being directly connected to the cathode of said cathode follower, the remaining terminal of said differentiating resistor being coupled to a point of fixed potential, the time constant of said differentiating capacitor and differentiating resistor being selected to differentiate said sawtooth waveform to produce a rectangular pulse;
   (e) and an inverting amplifier circuit having a control electrode connected to the junction between said differentiating capacitor and said differentiating resistor and an output electrode directly connected to the control electrode of said controllable discharge device for inverting said rectangular pulse and applying it to said controllable discharge device as a control signal to provide self-gating operation of said linear sawtooth generator.

2. A linear sawtooth generator comprising:
   (a) a capacitor, a resistor, and a unilateral impedance device connected in series in the order named across a source of potential, the charging of said capacitor through said resistor providing a sawtooth waveform;
   (b) a cathode follower amplifier circuit having a grid connected to the junction between said capacitor and said resistor, and having a cathode coupled to the junction between said resistor and said unilateral impedance device to provide a constant charging current for linearizing said sawtooth waveform;
   (c) a controllable discharge device connected in parallel with said capacitor for discharging said capacitor and being responsive to control signals applied to a control electrode for permitting said capacitor to charge;
   (d) a differentiating capacitor and a differentiating resistor connected in series, the remaining terminal of said differentiating capacitor being directly connected to the cathode of said cathode follower, the remaining terminal of said differentiating resistor being coupled to a point of fixed potential, the time constant of said differentiating capacitor and differentiating resistor being selected to differentiate said sawtooth waveform to produce a rectangular pulse;
   (e) and an inverting amplifier circuit having a control electrode connected to the junction between said differentiating capacitor and said differentiating resistor and an output electrode directly connected to the control electrode of said controllable discharge device for inverting said rectangular pulse and applying it to said controllable discharge device as a control signal to provide self-gating operation of said linear sawtooth generator;

(f) said controllable discharge device having a screen grid electrode and providing thereat a rectangular unblanking pulse in synchronism with said sawtooth waveform.

3. A linear sawtooth generator comprising:

(a) a capacitor, a resistor, and a unilateral impedance device connected in series in the order named across a source of potential, the charging of said capacitor through said resistor providing a sawtooth waveform;

(b) a cathode follower amplifier circuit having a grid connected to the junction between said capacitor and said resistor, and having a cathode coupled to the junction between said resistor and said unilateral impedance device to provide a constant charging current for linearizing said sawtooth waveform;

(c) a controllable discharge device connected in parallel with said capacitor for discharging said capacitor and being responsive to control signals applied to a control electrode for permitting said capacitor to charge;

(d) a differentiating capacitor and a differentiating resistor connected in series, the remaining terminal of said differentiating capacitor being directly connected to the cathode of said cathode follower, the remaining terminal of said differentiating resistor being connected to the slider of a potentiometer which is connected across a source of potential, the time constant of said differentiating capacitor and differentiating resistor being selected to differentiate said sawtooth waveform to produce a rectangular pulse;

(e) an inverting amplifier circuit having a control electrode connected to the junction between said differentiating capacitor and said differentiating resistor and an output electrode directly connected to the control electrode of said controllable discharge device for inverting said rectangular pulse and applying it to said controllable discharge device as a control signal;

(f) and a diode having the anode directly connected to the control electrode of said controllable discharge device for applying trigger pulses thereto, the position of the slider of said potentiometer selecting between self-gating operation and triggered operation of said linear sawtooth generator.

4. A linear sawtooth generator comprising:

(a) a capacitor, a resistor, and a unilateral impedance device connected in series in the order named across a source of potential, the charging of said capacitor through said resistor providing a sawtooth waveform;

(b) a cathode follower amplifier circuit having a grid connected to the junction between said capacitor and said resistor, and having a cathode coupled to the junction between said resistor and said unilateral impedance device to provide a constant charging current for linearizing said sawtooth waveform;

(c) a controllable discharge device connected in parallel with said capacitor for discharging said capacitor and being responsive to control signals applied to a control electrode for permitting said capacitor to charge;

(d) a differentiating capacitor and a differentiating resistor connected in series, the remaining terminal of said differentiating capacitor being directly connected to the cathode of said cathode follower, the remaining terminal of said differentiating resistor being connected to the slider of a potentiometer which is connected across a source of potential, the time constant of said differentiating capacitor and differentiating resistor being selected to differentiate said sawtooth waveform to produce a rectangular pulse;

(e) an inverting amplifier circuit having a control electrode connected to the junction between said differentiating capacitor and said differentiating resistor and an output electrode directly connected to the control electrode of said controllable discharge device for inverting said rectangular pulse and applying it to said controllable discharge device as a control signal;

(f) and a diode having the anode directly connected to the control electrode of said controllable discharge device for applying trigger pulses thereto, the position of the slider of said potentiometer selecting between self-gating operation and triggered operation of said linear sawtooth generator;

(g) said controllable discharge device having a screen grid electrode and providing thereat a rectangular unblanking pulse in synchronism with said sawtooth waveform.

References Cited in the file of this patent

UNITED STATES PATENTS

| | | |
|---|---|---|
| 2,562,295 | Chance | July 31, 1951 |
| 2,596,167 | Philpott | May 13, 1952 |

OTHER REFERENCES

MIT Radiation Laboratory Series, vol. 19, "Waveforms," page 649 (McGraw-Hill Book Co., 1949).